United States Patent [19]

Stumpf

[11] Patent Number: 5,483,780
[45] Date of Patent: Jan. 16, 1996

[54] PLANAR OR THREE-DIMENSIONAL CEILING LATTICEWORK CONSISTING OF BARS AND JOINT-FITTINGS, IN PARTICULAR A WALK-ON CEILING LATTICE

[75] Inventor: Walter Stumpf, Höchberg, Germany

[73] Assignee: MERO-Raumstruktur GmbH & Co. Wurzburg, Wurzburg, Germany

[21] Appl. No.: 210,501

[22] Filed: Mar. 18, 1994

[30] Foreign Application Priority Data

Mar. 19, 1993 [DE] Germany ............................ 43 08 745.0

[51] Int. Cl.⁶ .................................................. E04H 12/10
[52] U.S. Cl. ............................ 52/650.3; 52/654.1
[58] Field of Search ........................ 52/650.3, 653.1, 52/654.1; 403/7, 81, 110, 256, 257, 373, DIG. 9

[56] References Cited

U.S. PATENT DOCUMENTS 3,638,380  2/1972  Perri .................................. 52/653.1 X
4,173,102 11/1979  Judge ................................ 52/653.1 X
4,685,258  8/1987  Av-Zuk ............................ 52/650.3 X

OTHER PUBLICATIONS

D433MF2.90 issued by MERO–Raumstruktur GmbH & Co., Wuerzburg, Germany, 1990.

Primary Examiner—Carl D. Friedman
Assistant Examiner—Yvonne Horton-Richardson
Attorney, Agent, or Firm—Lowe, Price, LeBlanc & Becker

[57] ABSTRACT

In order to render more economical ceiling latticeworks constituted by bars and joint-fittings, the pillars and joint-fittings 14 evince an identical cross-sectional contour with longitudinal flutings, for instance a contour in the shape of a cross. Thereby, the pillars can be substituted for the joint-fittings 14 in the pillars' connection zone. The chord bars 12 of the ceiling lattice are hollow, cross-sectionally rectangular sections and are connected by clamping locks each comprising two clamping jaws 19, engaging and being clamped in flutings 24 of the joint-fittings 14 or pillars.

16 Claims, 15 Drawing Sheets

PLANAR OR THREE-DIMENSIONAL CEILING LATTICEWORK CONSISTING OF BARS AND JOINT-FITTINGS, IN PARTICULAR A WALK-ON CEILING LATTICE

FIELD OF THE INVENTION

The invention concerns planar or three-dimensional ceiling latticeworks composed of bars and joint-fittings, in particular a walk-on lattice with pillars for the lattice.

BACKGROUND ART

A three-dimensional ceiling latticework illustratively serving multi-story exhibition stands is known from the brochure D433MF2.90 issued by MERO-Raumstruktur GmbH & Co., Wuerzburg, Germany. This ceiling lattice is fitted with floor plates and therefore is a walk-on lattice. The floor plates rest on the chord bars and the joint fittings of the upper chord abut one another. The joint fittings comprise threaded boreholes into which are screwed the bars of the upper and lower chords of the ceiling lattice and its diagonal bars, and furthermore the pillars of this lattice. This design is complex in practice and requires comparatively high assembly costs.

It is further known with respect to three-dimensional lattices not only to screw the bars of the upper chord into the joint fittings, but also to make them rest in order to relieve the screw connections from shearing forces.

SUMMARY OF THE INVENTION

The object of the invention is to create an especially economical, planar or three-dimensional ceiling latticework, consisting of bars and joint-fittings, which is easy to assemble and especially well suited for multi-story exhibition stands.

The above problem is solved by the invention in that the pillars and joint-fittings evince right-cylindrical, cross-sectional contours and longitudinal flutings. That, in their connection zone, the pillars replace the joint-fittings, further that the chord bars of the ceiling lattice illustratively in the form of hollow rectangular bars, hereafter called sections, can be connected to the joint-fittings and pillars by chord bar clamping locks in their flutings. Accordingly, the joint-fittings evince the same cross-sectional contour as the pillars and illustratively can be manufactured from extruded aluminum sections from which the joint-fittings are cut off. In their connection zone, the pillars advantageously replace the joint-fittings because the chord bars of the ceiling lattice also can be connected to the pillars using the same clamping locks. The requirement of simple assembly is assured by a clamping method which is both rapid and operationally reliable. The ceiling lattice advantageously can be pre-mounted to the floor and at the free forepart. When hollow rectangular parts are used as chord bars foremost in the upper chord of the ceiling lattice, then these chord bars together with the joint-fittings allow directly resting floor plates on the ceiling lattice where said ceiling lattice is used, for instance, as a walk-on multi-story exhibition stands. However, the ceiling latticeworks of the invention also may be used for decorative purposes and, furthermore, the invention makes it possible to make large-scale ceiling lattices from lattice-girder units and cross-sectionally contoured pillars. In this case, the chord bars form the lattice-girder units. Accordingly, the invention makes possible the economical erection of planar or three-dimensional ceiling lattices for different purposes.

The sub-claims state the embodiment modes of the invention. Illustratively the pillars and joint-fittings may assume cross-sections which are polygonal, cross-wise, or evince several arms. For instance, the polygonal section may be of rectangular, hexagonal or octagonal contour.

In a further embodiment mode of the invention, the joint-fittings are supplemented at one end face by joint-segments with threaded boreholes to allow screw-connection of diagonal bars of a three-dimensional (two-tier) ceiling lattice. The joint segment illustratively may be a ball-joint segment and can be connected in various manner to the joint-fitting. The joint-segments are used to connect the diagonal bars of the three-dimensional ceiling latticework employing connecting techniques known per se.

In a further embodiment mode of the invention, the joint segments are mounted in rotatable and fixable manner relative to the joint-fittings, and the joint segment then can be moved into arbitrary positions relative to the joint-fitting with the longitudinally fluted section. Thus various geometries of three-dimensional lattices are made possible without thereby requiring another kind of joint. This possibility offers further savings in manufacture and assembly.

In yet another embodiment mode of the invention, the joint segment is connected to the joint-fitting by a screw passing through central boreholes in the joint-fitting and located in a head plate.

The screw connecting the joint-fitting and the joint segment advantageously assumes a dual function in a still further embodiment mode of the invention when it is extended upward and simultaneously is being used to affix a bar, illustratively, a railing bar erect on the ceiling lattice.

The head plate also shall assume two functions when, in a further embodiment mode of the invention, it is fitted with four retaining pins mounted cross-wise on floor-plates laid on the ceiling lattice and comprising corresponding clearances to receive the retaining rings.

In a further embodiment mode of the invention, the chord bars of the ceiling lattice are additionally resting on the joint-fittings and pillars and assembly is simplified thereby. Moreover, loads from the chord bars are directly transferred to the joint-segments and pillars.

In another embodiment mode of the invention, the clamping locks each comprise two clamping jaws supported in the ends of the chord bars and rotatable about vertical axes, which are spring-loaded into their inoperative initial position and being made to expand by an adjusting screw into their operative position wherein outer contoured ends of the clamping jaws engage the correspondingly contoured flutings in the joint-fittings to provide a support in a frictionally and geometrically locking manner. In the process, the support bolts of the clamping jaws transmit the tensile and compressive forces in the upper and lower chord of the ceiling lattice.

In another embodiment mode of the invention, the pillars terminate at their upper ends at the top side of the ceiling lattice and, as a result, the floor plates can be directly laid on the chord bars in the upper chord of the ceiling lattice to provide a walk-on ceiling lattice.

In the event of large-scale, decorative ceiling lattices, the pillars may advantageously project like towers beyond the ceiling lattice. In this case, bracing may be provided by cables between the upper ends of the pillars and the ceiling lattice. As a result, comparatively wide spans are achievable.

Another embodiment mode of the invention is characterized in that the ceiling lattice consists of lattice-girder units connected on edge to the pillars and joint-fittings and of which the lengths correspond substantially to the overall height of the lattice-girder units. Thereby, large-scale ceiling lattices can also be made, the lattice-girder units being directly connectable to the pillars by means of the clamping locks which evince the same longitudinally fluted sections as the fitting-joints.

Another variation of the decorative ceiling lattice is characterized in that the gaps between the ceiling-lattice components are filled for instance by canvas or textile membranes.

In a further embodiment mode of the invention, the mutually opposite longitudinal flutings of adjacent pillars receive wall components underneath the ceiling lattice. This advantageous feasibility of connecting the wall follows from the special longitudinal fluted pillar sections.

Another embodiment mode of the invention is characterized in that connection sections for wall components can be clamped into the longitudinal flutings of the pillars underneath the ceiling lattice. As a result, it is feasible to affix wall components to the pillars in such a way as to mask the skeleton frame, as is especially desirable for exhibition stands.

BRIEF DESCRIPTION OF THE DRAWINGS

The invention is elucidated below in relation to drawings of illustrative embodiments.

Figure 1:
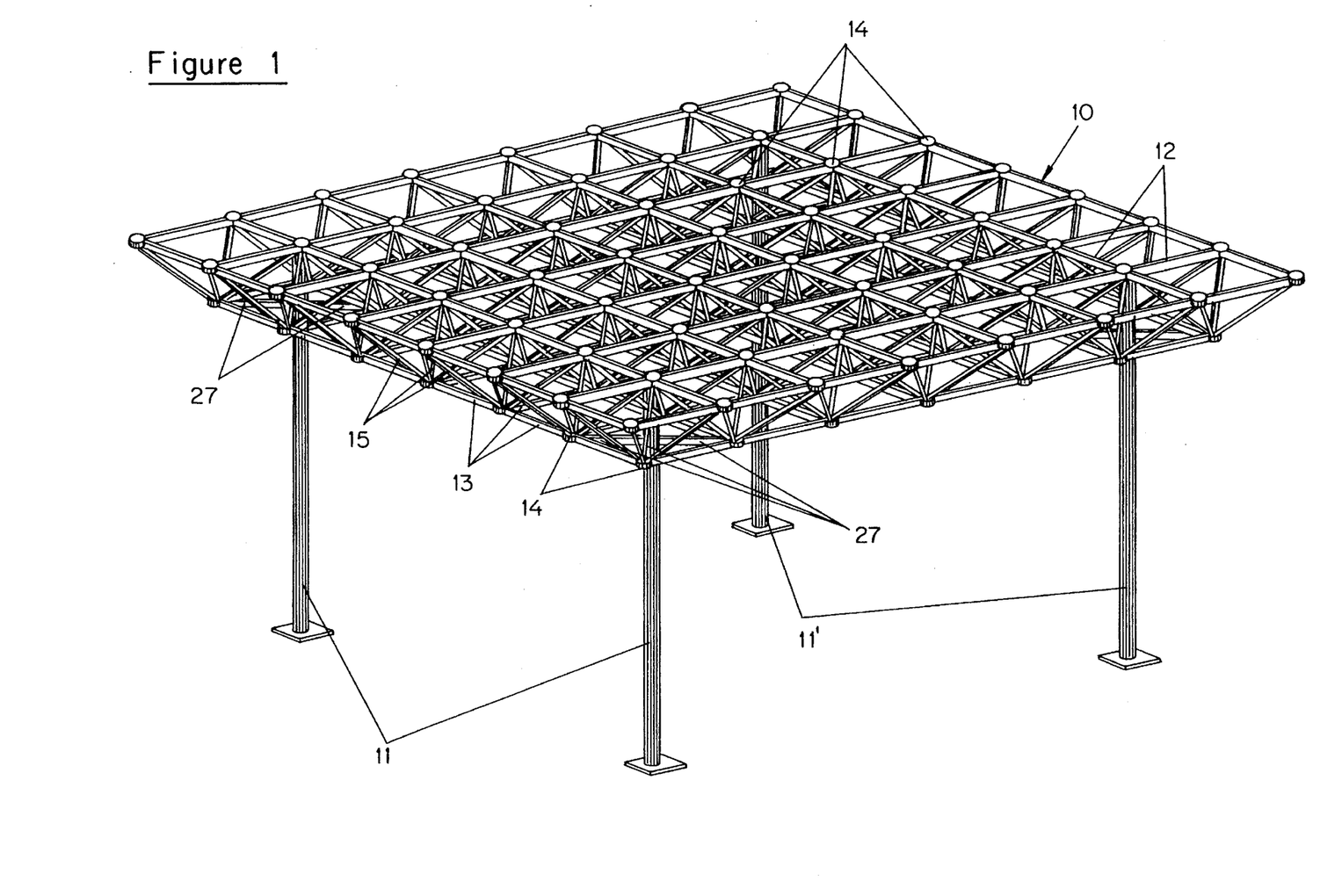
FIG. 1 is a perspective of a three-dimensional (two-tier) ceiling lattice illustratively borne by four pillars of which the cross-sectional contour matches that of the joint-fittings of the ceiling lattice.
Figure 2:
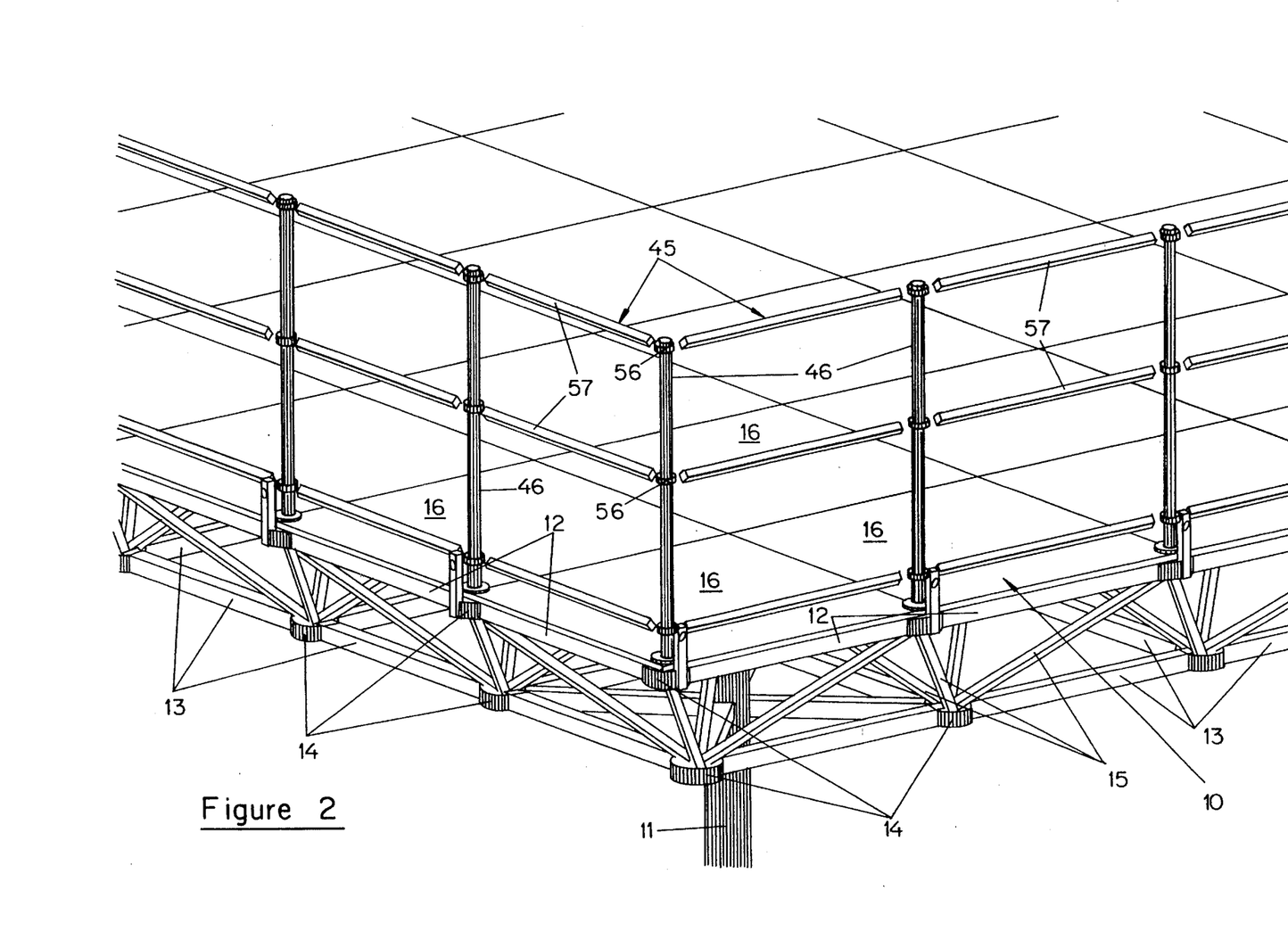
FIG. 2 is an enlarged cutaway of the ceiling lattice of FIG. 1 of a corner region, but shown with floor plates and a railing.

The three-dimensional ceiling latticework 10 shown in FIGS. 1 and 2 illustratively evinces a rectangular planview and rests on four pillars 11, 11' of which the two front pillars 11 are so-called clamped pillars and the two rear pillars 11 are so-called rocker piers as elucidated further below. The bars 12 of the upper chord and the bars 13 of the lower chord both consist of the same rectangular hollow sections to which are connected joint-fittings 14 in turn connected by diagonal bars 15 to one another. The pillars 11, 11' and the joint-fittings 14 evince an identical longitudinally fluted cross-sectional contour for instance of a cross, the pillars 11, 11' replacing the joint-fittings 14 in their connection zones. The three-dimensional ceiling lattice 10 is a walk-on lattice (FIG. 2) embodiment and accordingly it supports floor plates 16 abutting one another and square in planview, matching the grid of the ceiling lattice 10.

Figure 3:
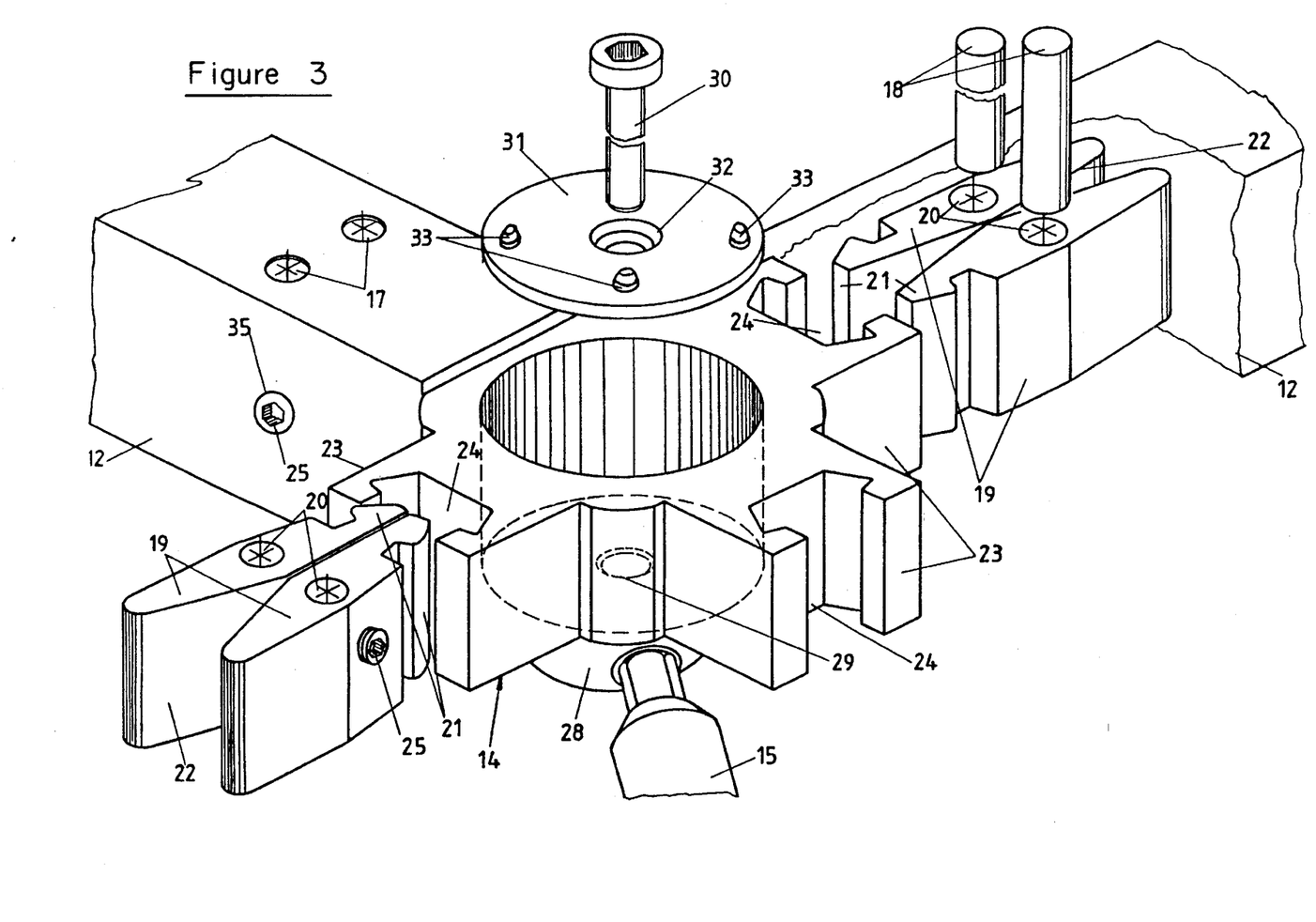
FIG. 3 is a perspective of a detail of a joint of the ceiling-lattice of FIGS. 1 and 2, shown partly in exploded view and illustrating the connection by means of clamping locks of the chord bars to a cross-shaped joint-fitting.
Figure 5:
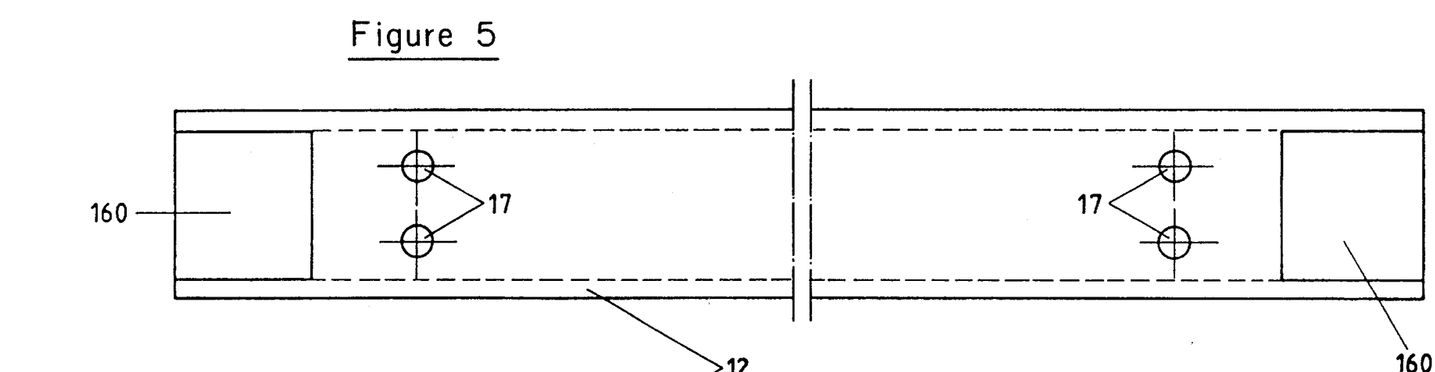
FIGS. 5 and 6 show a view from below and above resp. of a cross-sectionally contoured chord bar used with the ceiling lattice of FIGS. 1 through 4.
Figure 6:
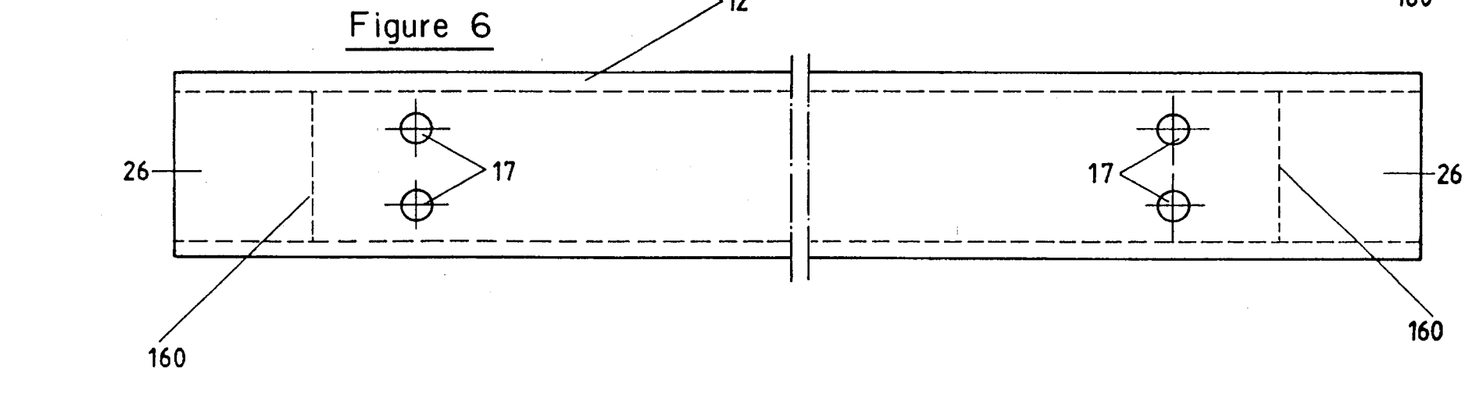

Presently FIGS. 3 through 6 will be considered. FIGS. 5 and 6 show a chord bar 12 consisting of a rectangular hollow section and comprising at both ends of its lower side a receiving clearance 160. The bars 13 in the lower chord correspond to the bars 12 in the upper chord. Moreover each chord bar 12 or 13 comprises pairs of boreholes 17 near its ends in its upper and lower walls that are mutually aligned vertically and serve to receive support bolts 18 for clamping jaws 19 (FIG. 3). For that purpose the clamping jaws 19 are fitted with corresponding boreholes 20 passing the support bolts 18. Each pair of clamping jaws 19 forms a clamping lock in the ends of the chord bars 12 and 13 to make possible the linking of the chord bars 12, 13 and the joint-fittings 14 or pillars 11, 11'. The clamping jaws 19 comprise outer contoured, hook-shaped ends 21 and rearward or inner ends between which is held for instance a leaf spring 22 spring-loading the clamping jaws 19 into their inoperative initial position shown left in FIG. 3.

As already mentioned, the joint-fittings 14 and the pillars 11, 11' evince the same longitudinally fluted cross-sectional shape of a cross. FIG. 3 shows the details of cross-shaped joint-fitting 14. This joint-fitting 14 is cut off an extruded section illustratively made of aluminum which is also the material of the pillars 11, 11' and in this instance comprises four arms 23 arrayed like a cross and fitted with outward flutings 24 of which the inside dovetailed cross-section matches the cross-shaped contoured ends 21 of the clamping jaws 19 which thereby can be anchored into said flutings 24. For that purpose the clamping jaws 19 may be spread apart by an adjusting screw 25 as indicated at the top right of FIG. 3.

In order to be mounted for instance to the floor, the chord bars 12 and 13 are inserted from above by their clearances 160 onto the arms 23 of the cross-sectionally cross-shaped joint-fitting 14 and in the process will rest by a wall segment 26 on their arms 23. The clamping locks, ie the clamping jaws 19 are in their inoperative position during this phase (left bottom of FIG. 3). Thereupon the adjusting screws 25 of the clamping locks are actuated to spread apart the clamping jaws 19, whereby their contoured, hook-shaped ends 21 will be pressed against the undercut sidewalls of the flutings 24. The adjusting screws 25 can be rotated using a screwdriver correspondingly inserted through the boreholes 35 in the sidewalls of the chord bars 12 and 13. The chord bars 12 are connected in similar manner to the upper ends of the pillars 11 and 11' which, as already mentioned, evince the same cross-sectional contour as the joint-fittings 14 and thereby do each replace one joint-fitting 14 in the upper chord.

In the embodiment mode of clamped pillars 11 (FIG. 1), four bars 27 in each case are provided which extend away from the joint-fittings 14 of the lower chord to the pillars 11 where they may be illustratively screwed tight by means of a block with threaded borehole guided in a channel.

Figure 4:
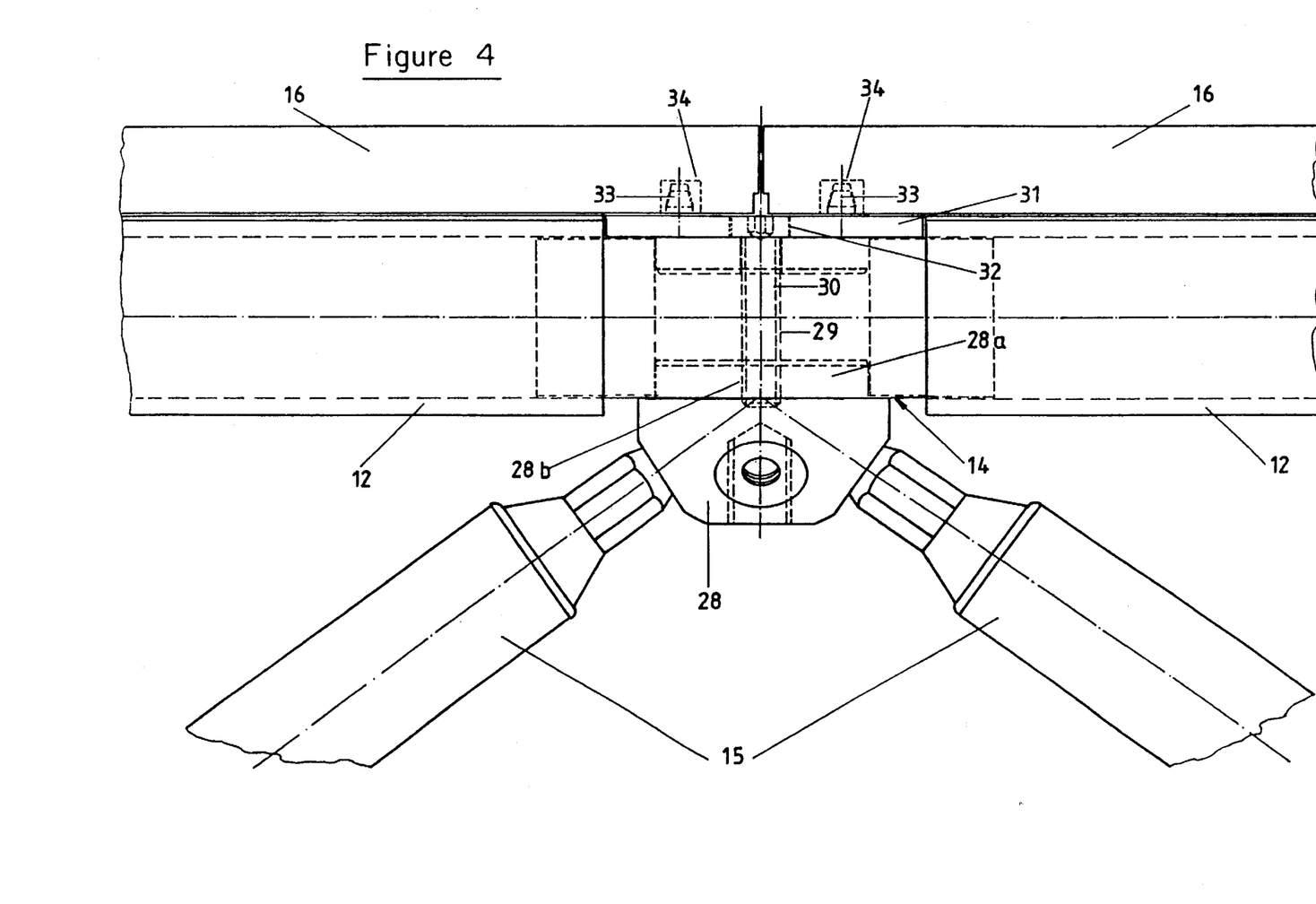
FIG. 4 is a sideview of the joint-fitting detail of FIG. 3 in the final-assembled state when bearing floor plates.

The cross-shaped joint-fittings 14 of the upper chord and lower chord of the ceiling lattice 10 each are provided at one end face for instance with ball-fitted joint segments 28 comprising threaded boreholes for screw-connections of the diagonal bars 15 of the two-tier ceiling lattice 10. This connection technique is known and thus need not be discussed any further. The ball-fitted joint segments 28 for instance may comprise a flat cylindrical projection 28a (FIG. 4) extending in snugly fitting manner into a central borehole of the junction-fittings 14. A central threaded borehole 28b is present in the mentioned peg 28a of the ball-fitted joint segment 28 and passes through a borehole 32 in the head plate 31 and through a borehole 29 in the joint-fitting 14. The head plate 31 is kept by the screw 30 against the joint-fitting 14 (FIG. 4). The advantage of this design is that the ball-fitted joint-segments 28 can be rotated relative to the cross-shaped joint-fittings 14 in relation to the geometry of three-dimensional ceiling latticework, and then can be fixed in place by the screws 30. The joint-fittings 14 in the lower chord of the ceiling lattice 10 correspond to those in the upper chord, however the ball-fitted joint-segments 28 of these joint-fittings are mounted in correspondingly mirror-symmetrical manner.

The thickness of the head plate 31 is selected in such manner that it will be flush with the top sides of the connected chord-bars 12 (FIG. 4) when in the assembled state. In the embodiment mode of FIGS. 3 and 4, each head plate 31 comprises four retaining pins 33 arrayed cross-wise and engaging matching recesses 34 at the bottom side of the floor plates 16. As a result the corners of four floor plates 16 each time are aligned vertically on the center axis of each cross-shaped joint-fitting 14 and they are further aligned with respect to the longitudinal axes of the pillars 11 or 11'.

Figure 2A:
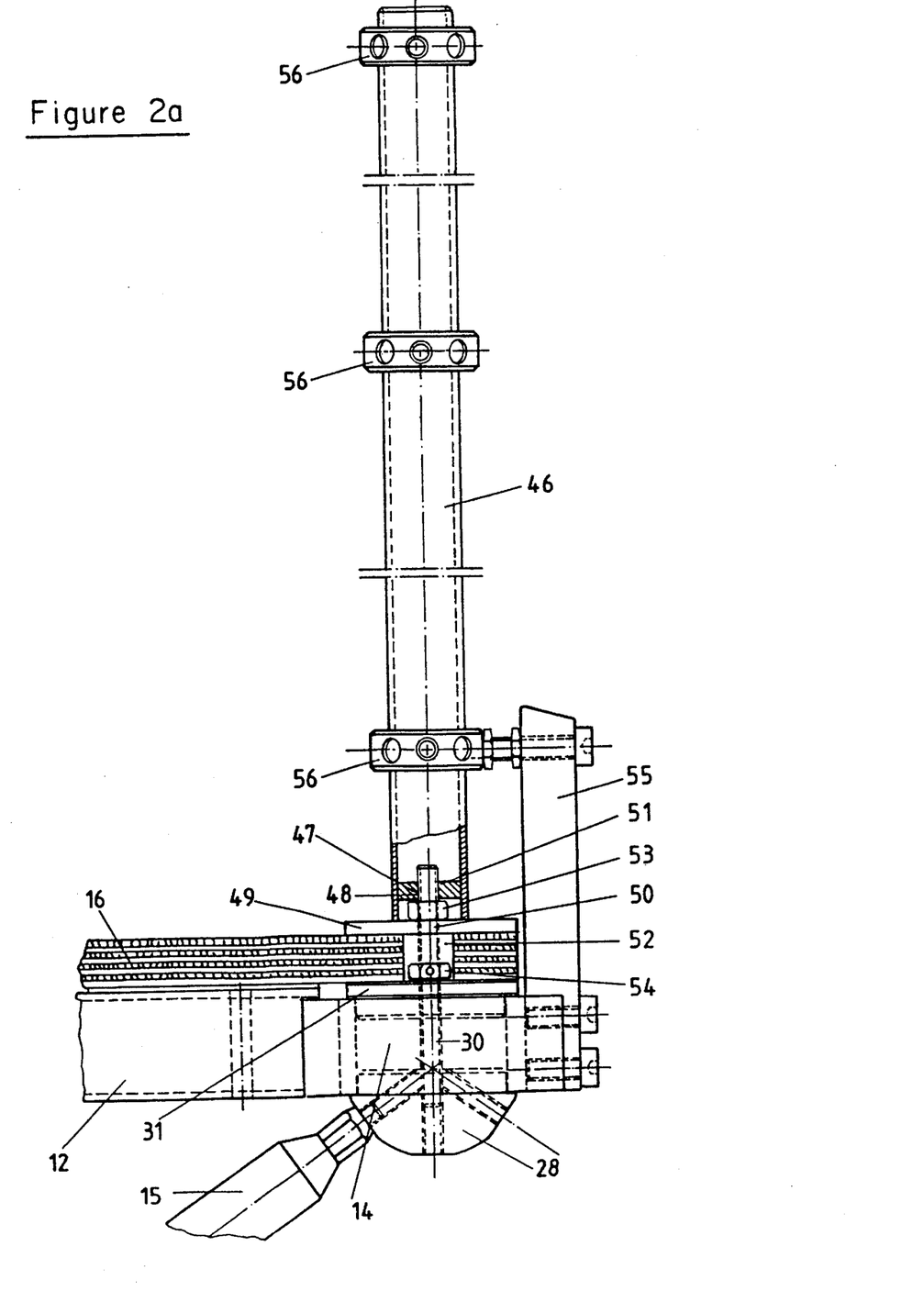
FIG. 2a is a detail at the edge of the ceiling lattice of FIGS. 1 and 2 showing an upright railing bar and its fastening to the ceiling lattice.

The ceiling lattice 10 shown in FIG. 2 supports floor plates 16 and therefore is a walk-on type and fitted at the edge with a railing 45. FIG. 2a shows how an upright railing bar 46 is affixed to the support lattice 10.

The railing bar 46 consists for instance of a round pipe with a disk 47 comprising a threaded borehole 48 being welded into its lower end. A foot plate 49 with a central borehole 50 is mounted between the lower end of the railing bar 46 and a floor plate 16. An extended thread segment 51 of the affixing screw 30 passes through a borehole 52 in the floor plate 16 and through the borehole 50 into the threaded borehole 48. This screw connection is tightened by a nut 53. A further nut 54 is screwed onto the thread segment 51 and keeps the head plate 31 against the joint-fitting 14. In this case too the affixing screw 30 connects the fitting-joint 14 to the ball-fitted joint segment 28. A bracing bracket 55 stabilizes the railing bar 46 and is screwed on one hand into a ring 56 with many threaded boreholes and on the other hand into the joint-fitting 14. The ring 56 and two further rings 56 are fastened to the railing bar 46, the two upper rings 56 being used for screw-connection of the horizontal bars 57 of the railing 45.

Figure 7:
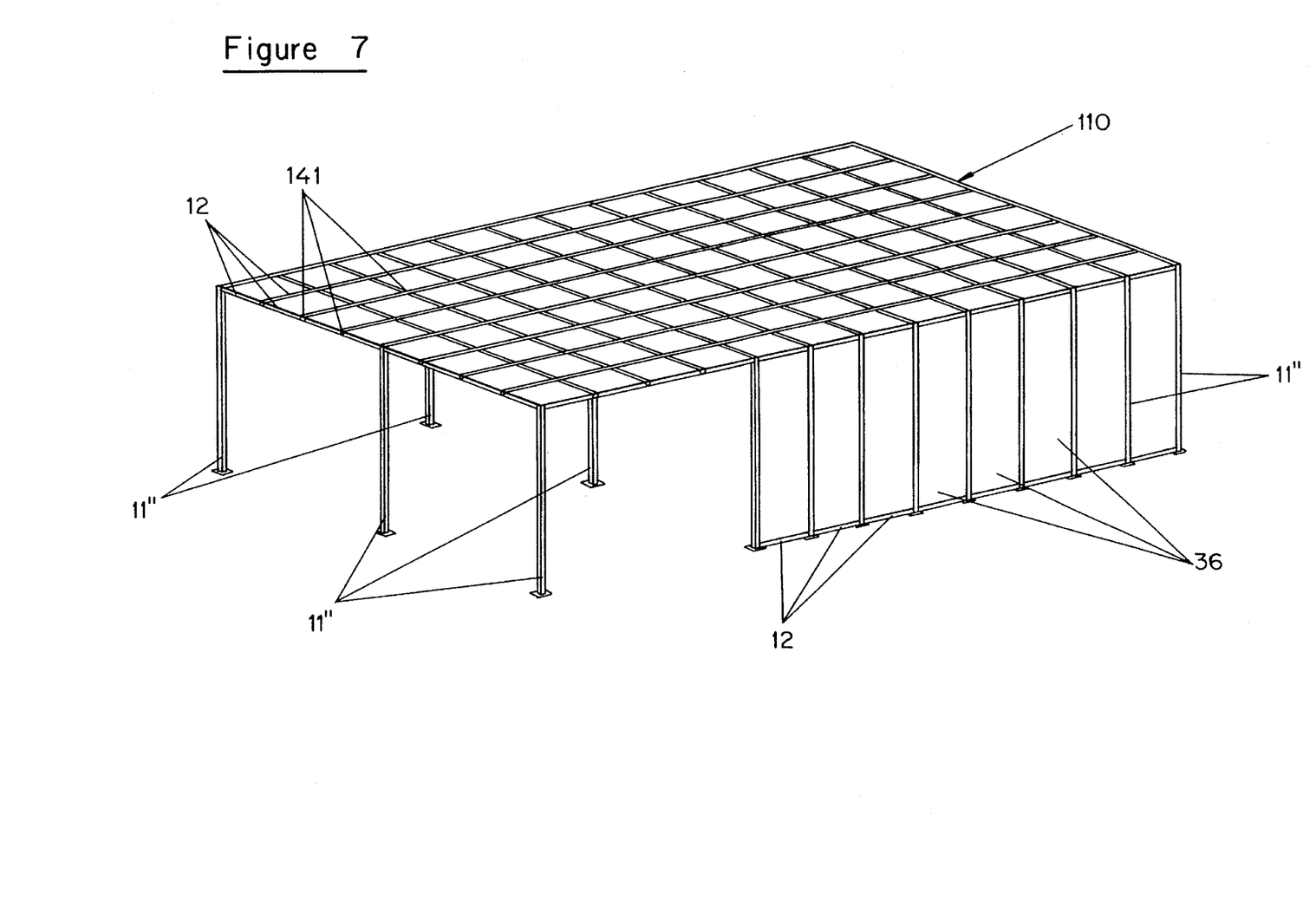
FIG. 7 is a perspective of a planar, or single-tier ceiling lattice where the supports and the joint-fittings of the ceiling lattice evince the same cross-sectional contour.
Figure 8:
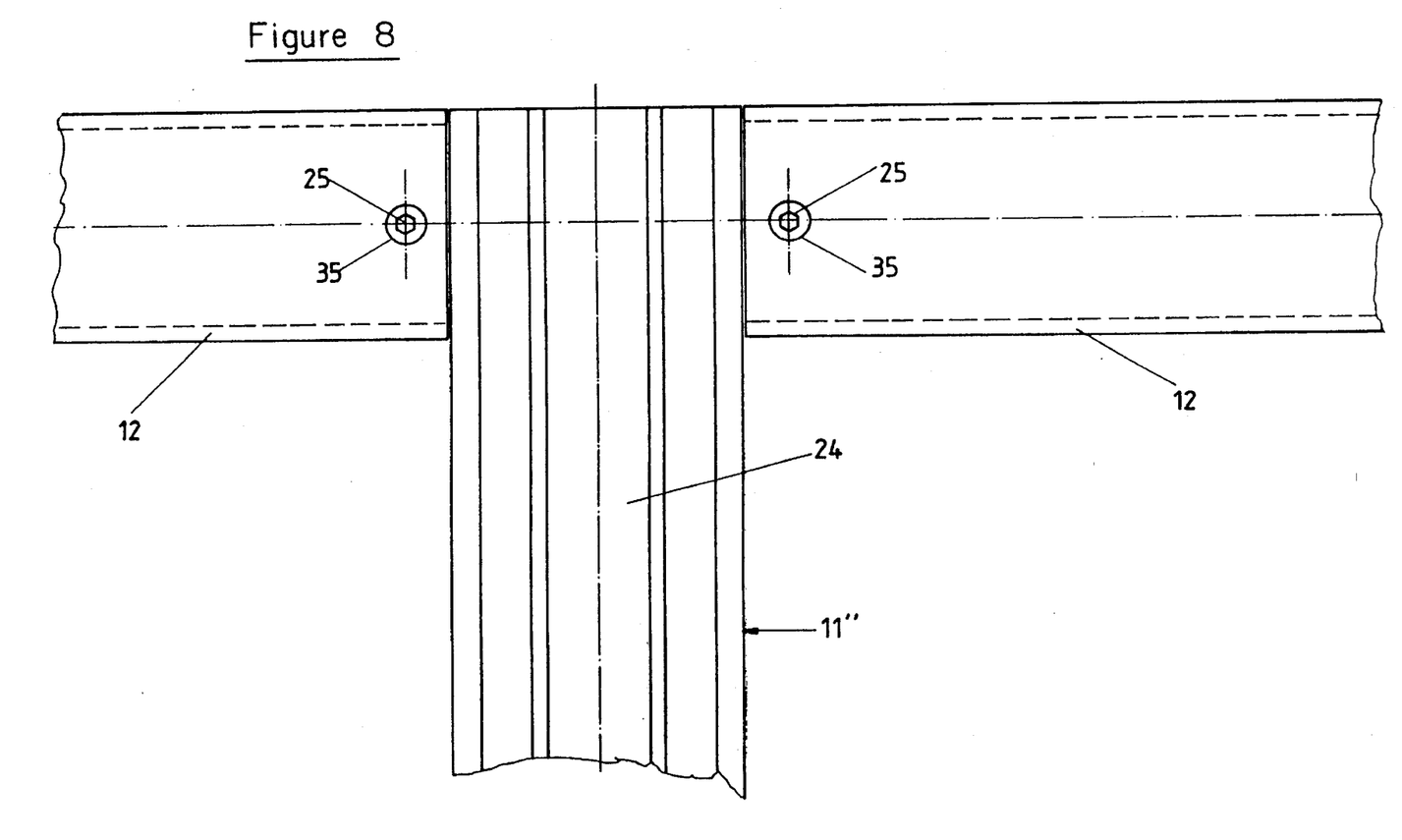
FIG. 8 is a cutaway of the ceiling lattice shown in FIG. 7 to illustrate how the chord bars consisting of hollow rectangular sections are connected to the pillars.
Figure 15:
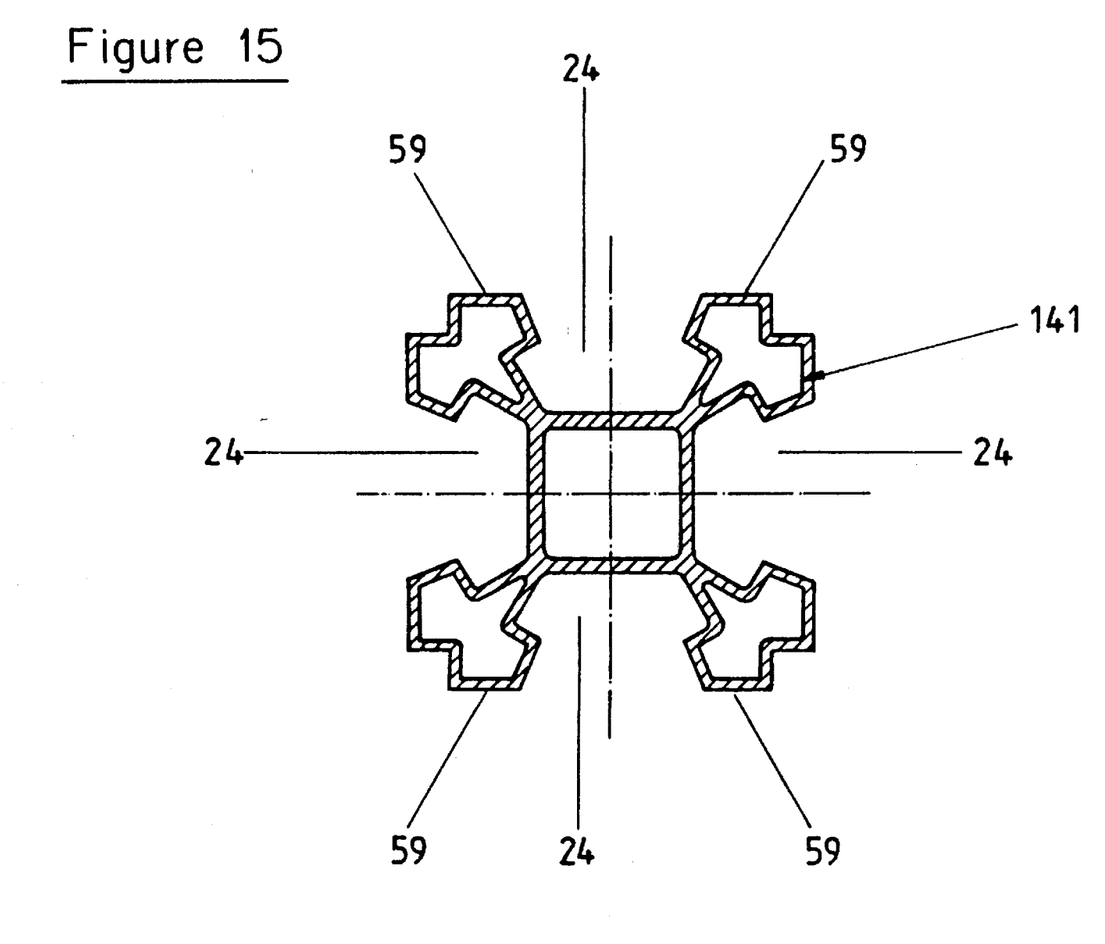
FIG. 15 is a cross-section of a longitudinally fluted four-arm section for pillars and joint-fittings and allowing special hookup of wall components externally masking the joint-fittings or pillars.

FIG. 7 shows a planar, ie a single-tier ceiling lattice 110 supported on numerous pillars 11" (FIG. 15). The ceiling lattice 110 is constituted of chord bars 12 and joint-fittings 141 (FIG. 15) yet to be described. The cross-sectional contour of the joint-fittings 141 and of the pillars 11" again is the same and accordingly the chord bars 12 can be connected in the same manner to the upper ends of the pillars 11 as are the joint-fittings 141, as shown by FIG. 8. FIG. 8 furthermore shows the boreholes 35 in the side walls of the chord bars 12 consisting of rectangular hollow sections, said boreholes 35 allowing passing the screwdriver for the adjusting screws 25 of the clamping locks. By their upper ends, the pillars 11" substantially are flush with the top side of the ceiling lattice 110. At the edge of the ceiling lattice 110, illustratively wall components 36 are inserted into the mutually opposite longitudinal flutings 24 of adjacent pillars 11". In this design the lower ends of the pillars 11" are mutually connected by further chord bars 12. If the pillars 11" are suitably arrayed, such wall components 36 also may be placed inside the planview bounded by the ceiling lattice 110. When the ceiling lattice 110 is used only for decorative purposes, the gaps between the chord bars may be filled with arbitrary elements made of wood, metal, plastic or textiles.

Figure 9:
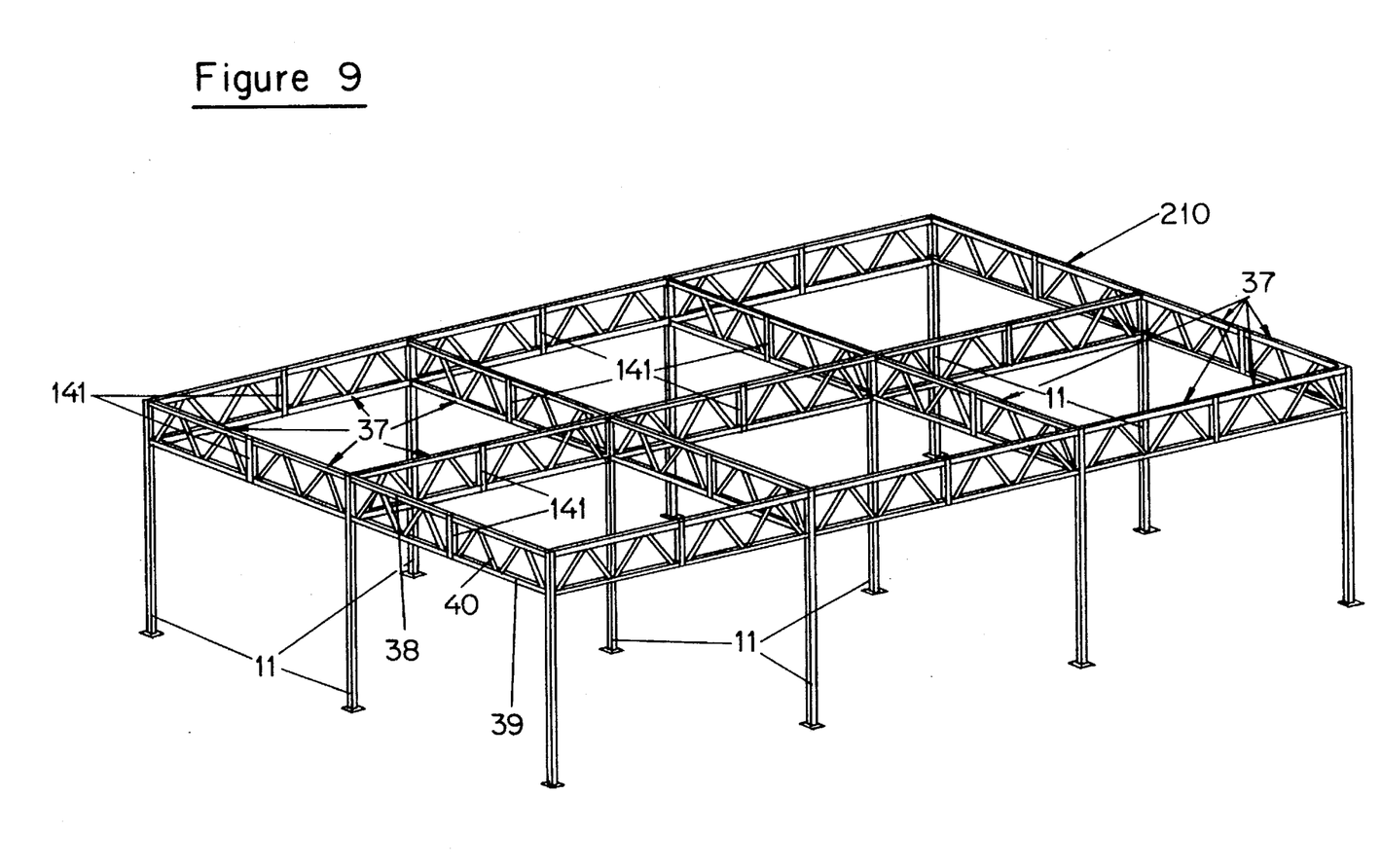
FIG. 9 is a perspective of a ceiling lattice consisting of lattice-girder units.

In the embodiment mode shown in FIG. 9, the ceiling lattice 210 comprises so-called lattice-girder units 37 which are connected on edge to the pillars 11 and joint-fittings 141. The joint-fittings 141 are suitably long for such purposes, their cross-sectional contour (FIG. 15) also matching that of the pillars 11. Each lattice-girder unit 37 consists of an upper and a lower chord bar 38 and 39 resp. which are illustratively joined by a so-called lattice snake 40. The lattice snake 40 also may be replaced by flat web members, where called for perforated ones. The upper chord bars 38 and the lower chord bars 39 evince the same rectangular cross-sectional contour with channel for receiving the individual web members or lattice snake. The bars 38, 39 are connected to the upper ends of the pillars 11 and joint-fittings 141 in the manner of the embodiment mode shown in FIG. 3. However the contoured ends 21 of the clamping jaws 19 project beyond the end faces of the chord bars 39 at the lower chord bars 39 of the lattice-girder units 37 in order to allow being inserted into the flutings 24 in the joint-fittings 141 or pillars 11. In this embodiment mode as well the pillars 11 are flush at their upper ends with the topside of the ceiling lattice 210 or the lattice-girder units 37. The gaps between the lattice-girder units 37 may be filled for instance by omitted textile sealing components affixed to the lattice-girder units 37.

Figure 10:
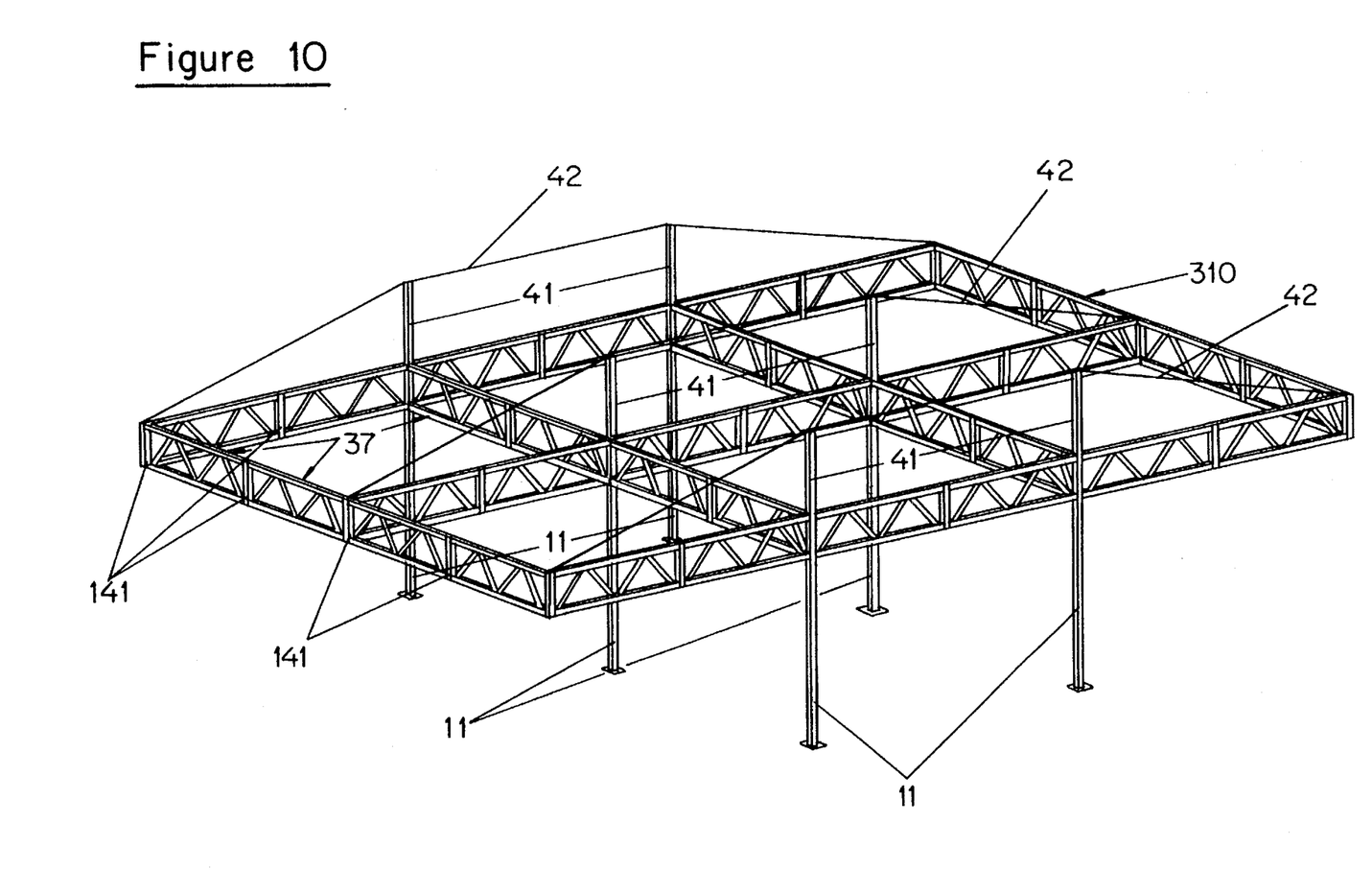
FIG. 10 is another perspective of a ceiling lattice consisting of lattice-girder units and section-pillars projecting like towers above the lattice-girder units and making possible wire-cable bracing.

The ceiling lattice 310 shown in FIG. 10 also consists of lattice-girder units 37 which are connected as in the embodiment mode of FIG. 9 to pillars 11 and joint-fittings 141 (FIG. 15). In this embodiment mode however the pillars 11 project by their upper ends 41 like towers above the ceiling lattice 310 and wire cables 42 are tensioned between the upper ends 41 of the pillars 11 and the edge of the ceiling lattice 310 to help stabilize this ceiling lattice 310. In this embodiment as well the gaps between the lattice-girder units 37 may be filled for instance with textile sealing components (so-called canvases or membranes).

Figure 11:
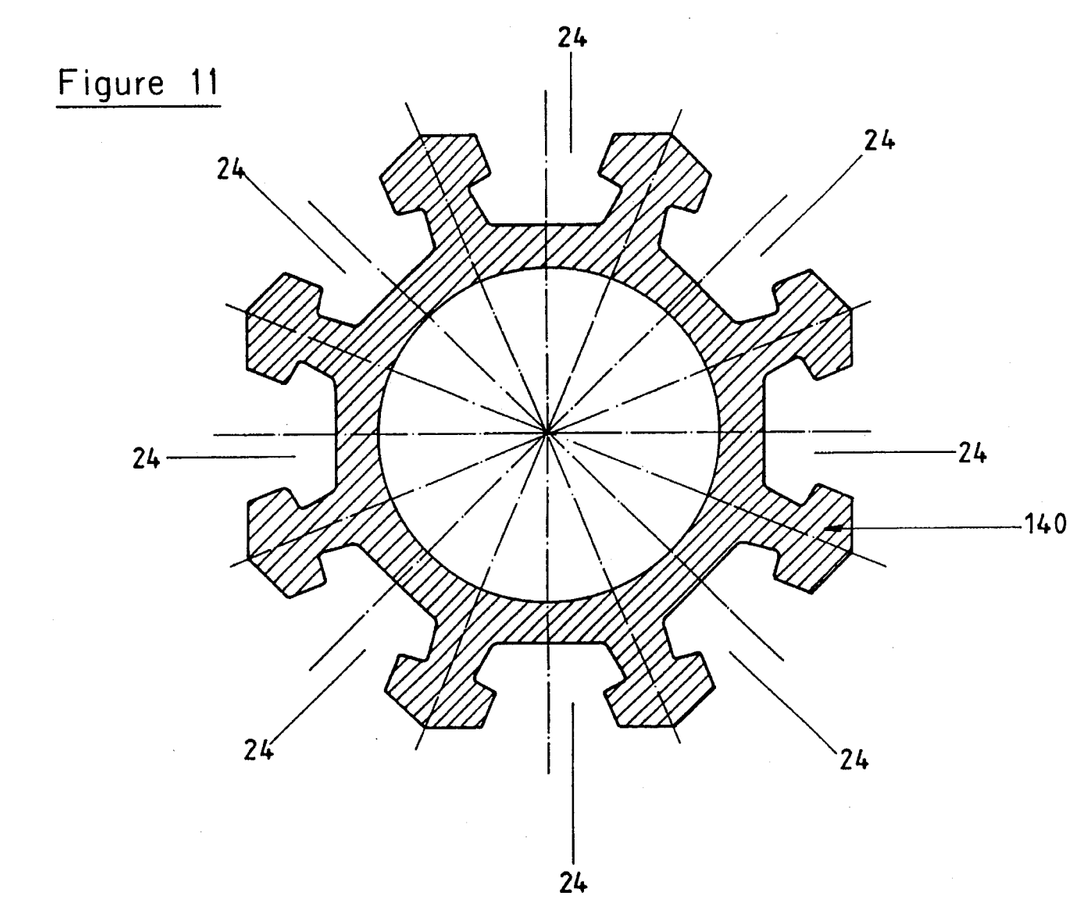
FIG. 11 is a cross-section of a longitudinally fluted octagonal section for pillars and joint-fittings which illustratively may replace the cross-shaped section of FIG. 3.
Figure 12:
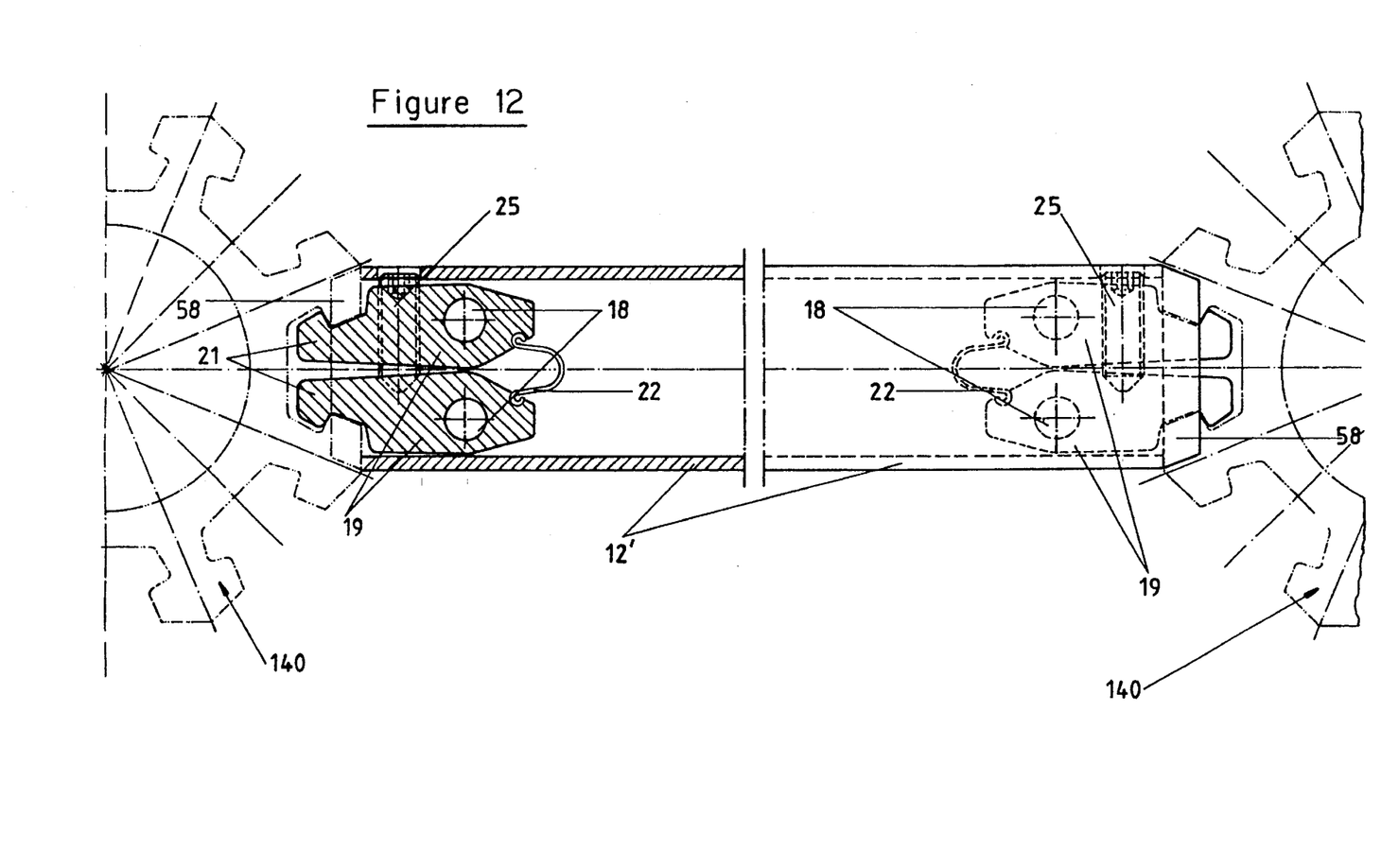
FIG. 12 is a topview of a chord-bar section shown partly in cross-section and affixed by clamping locks to and resting on two joint-fittings or pillars, FIGS. 13 and 14 each represent view from below of the chord bar-section of FIG. 12.
Figure 13:
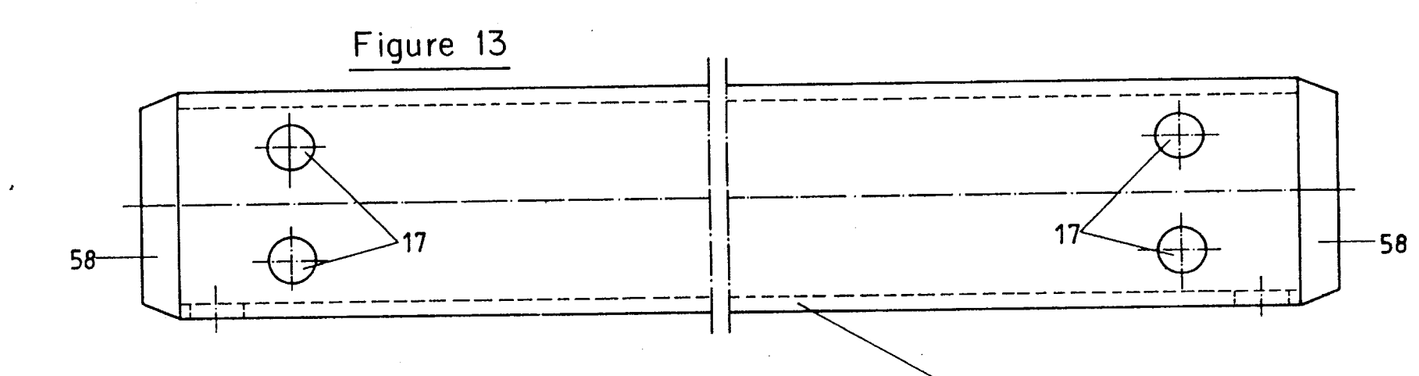
Figure 14:
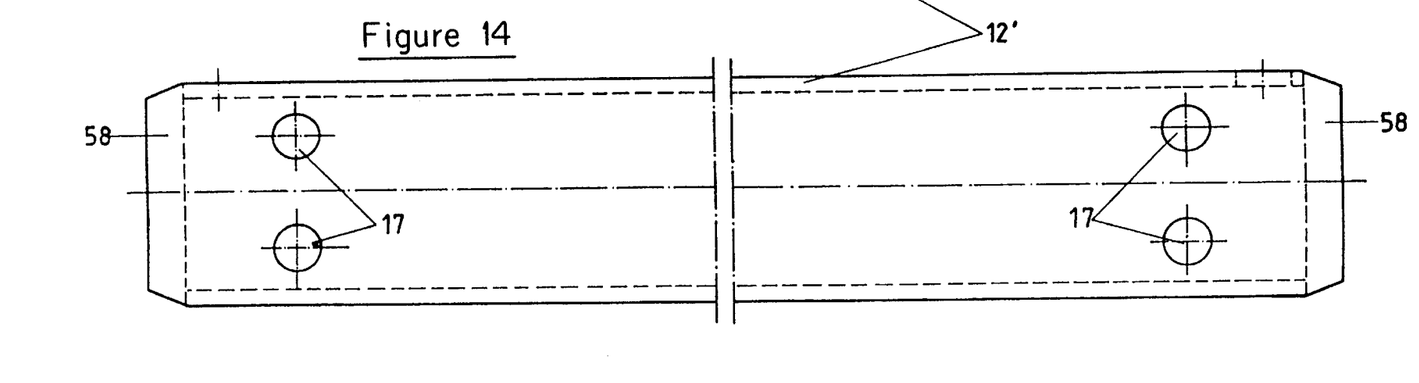

FIG. 11 is an illustrative octagonal extruded aluminum section similar to the joint-fitting 14 of FIG. 3, from which the joint-fittings 140 may be cut off. However the pillars 11 and 11' also can be made from this octagonal extruded section. Such a joint-fitting 140 or such a pillar will then comprise eight outwardly open flutings 24 of which the inside, dovetailed cross-section also matches the cross-sectionally hook-contoured ends 21 of the clamping jaws 19. Accordingly and as in the embodiment mode of FIG. 3, the clamping jaws 19 can be frictionally anchored into these flutings 24 as shown in FIG. 12. FIG. 12 shows a chord bar 12' consisting of a rectangular hollow section which is clamped between two joint-fittings 140. The chord bar 12' furthermore is shown in FIGS. 13 and 14 and is a continuous tetragonal tube with one projection 58 at each end. The projections 58 serve to rest the chord bar 12' on the joint-fittings 140, or on the pillars with the same cross-sectional contour. The clamping locks with the clamping jaws 19 in the ends of the chord bar 12' correspond to those of FIG. 3 and those are referred to for description.

Figures 16, 17:
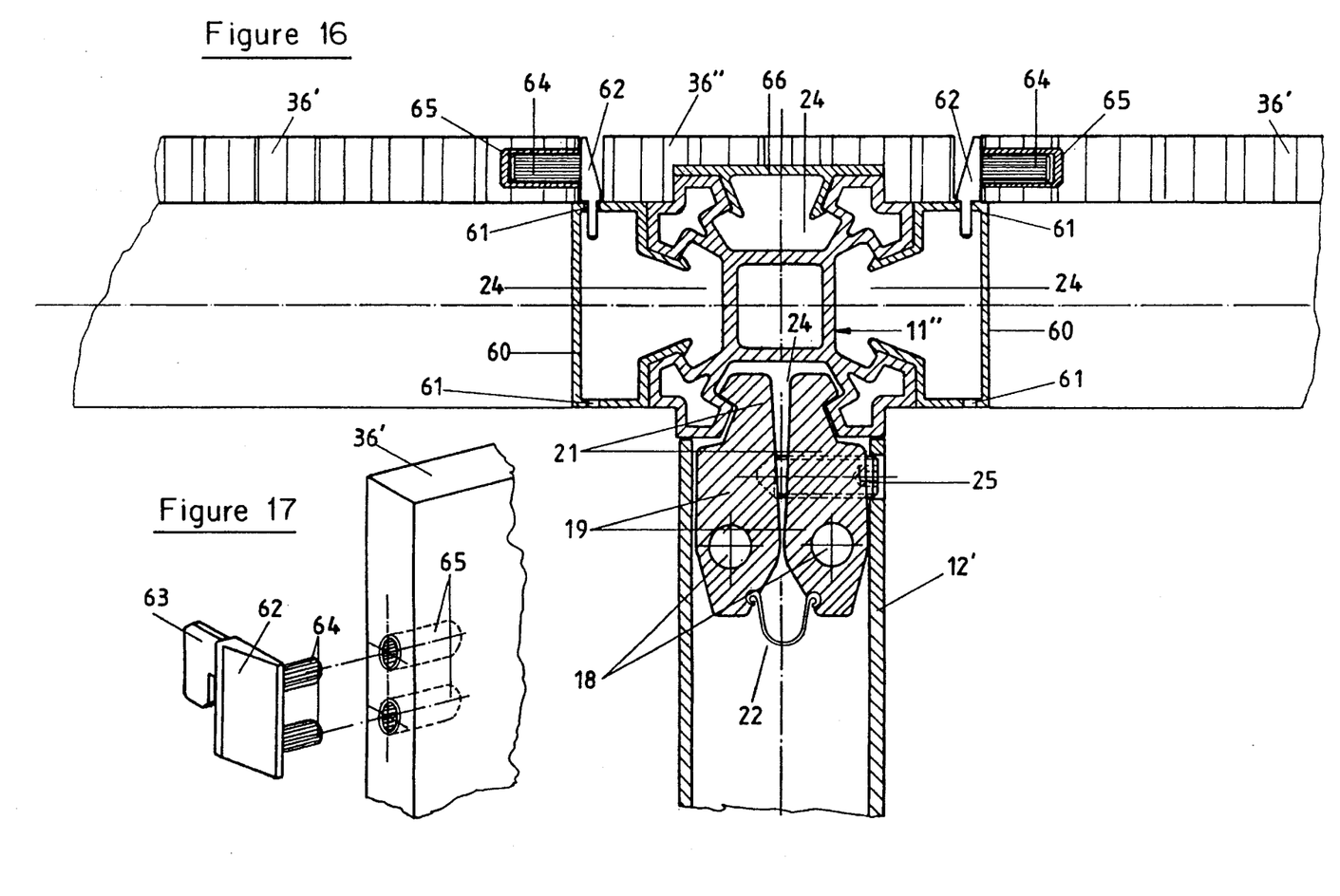
FIG. 16 is a cross-section for instance of a pillar with the fluted section of FIG. 15 and of parts of a chord bar-section and wall components affixed to the pillar.
FIG. 17 is a detail view of a connecting device for connecting a wall component of FIG. 16.

FIG. 15 shows a further embodiment mode of an aluminum extruded section which also might be designated being a four-arm section, where the hollow arms 59 are arranged in mutually diagonally opposite manner on a basic tetragonal section. Again joint-fittings 141 may be cut off this extruded section which may also serve to make pillars 11" (FIGS. 7 and 16). The four hollow arms 59 again laterally bound longitudinal flutings 24 which correspond to those of the already described sections. The inside, dovetailed cross-section of these longitudinal flutings 24 also matches the cross-sectionally hook-shaped ends 21 of the clamping jaws 19. Accordingly the clamping jaws 19 can be anchored into these longitudinal flutings 24 (FIG. 16).

If for instance it is desired to mount wall-facing on the pillars 11", then the implementation may be carried out as shown in FIG. 16. As already mentioned, the pillars 11" evince the cross-sectional contour shown in FIG. 15. Therefore chord bars 12' may be affixed and if called for superposed on the pillars 11" by means of the clamping locks using the clamping jaws 19 in the manner of the embodiment mode of FIG. 12. Other connection sections 60 can be affixed in snap-in or jamming manner in the other longitudinal flutings 24 of the pillars 11". These connection sections 60 comprise a number of slots 61 into which wall fasteners 62 can be suspended using corresponding hooks 63. Illustratively the wall fasteners 62 each comprise two pins 64 to be plugged into boreholes 65 in wall units 36'. Sealing strips 36" can be affixed using a connection section 66 directly to the pillars 11" between the wall units 36'. The connection sections 66 can be snapped into the longitudinal flutings 24 by means of elastic legs in the manner of the connection sections 60. In this manner a practically continuous wall can be mounted in front of the pillars 11" which thereby remain masked, or are not seen from the outside.

I claim:

1. A ceiling latticework consisting of chord bars and joint-fittings and pillars for supporting said ceiling lattice, characterized in that the pillars (11) and joint-fittings (14) evince identical right-cylindrical cross-sectional contours and longitudinal flutings and wherein, in connection zones where the pillars meet the chord bars, the pillars (11) replace the joint-fittings (14) each of said chord bars (12, 38,) comprising hollow rectangular sections of the ceiling lattice (10, 110, 210, 310) connected to the joint-fittings (14) and the pillars (11) by means of clamping locks (18–22) affixable in flutings (24) of said pillars and said joint fittings.

2. Ceiling lattice defined in claim 1, characterized in that the pillars (11) and joint-fittings (14) evince a cross-sectional contour in the form of a polygon, a cross, or a multi-arm contour.

3. Ceiling lattice defined in claim 1, characterized in that the joint-fittings (14) are supplemented at one end face by joint segments (28) having threaded boreholes, said ceiling lattice further comprising diagonal bars (15) for connection to said joint segments (28) to create a three dimensional ceiling lattice.

4. Ceiling lattice defined in claim 3, characterized in that the joint segments (28) are mounted in rotatable and fixable manner relative to the joint-fittings (14).

5. Ceiling lattice defined in claim 3, characterized in that each joint segment (28) is connected to a respective joint-fitting (14) by a screw (30) present in a head plate (31), said screw passing through central boreholes (29, 32) in the joint-fitting (14).

6. Ceiling lattice defined in claim 5, characterized in that the screw (30) connecting the joint-fitting (14) and the joint-segment (28) is extended upward (51) and affixes to a bar (46) which is upright on the ceiling lattice (10).

7. Ceiling lattice defined in claim 5, characterized in that the head plate (31) includes four cross-wise mounted retaining pins (33), said retaining pins receiving floor plates (16) which are laid on the ceiling lattice (10), each said floor plate (16) fitted with matching clearances (34) to receive the retaining pins (33) of said head plate.

8. Ceiling lattice defined in claim 1, characterized in that the chord bars (12) of the ceiling lattice (10; 110) rest on the joint-fittings (14) and pillars (11).

9. Ceiling lattice defined in claim 1, characterized in that the clamping locks each comprise two clamping jaws (19) rotatably supported about vertical axes in the ends of the chord bars (12) and spring-loaded by a spring (22) into their inoperative initial position, being spread into their operative position by an adjusting screw (25), the outer, cross-sectionally contoured ends (21) of these clamping jaws (19) when in their operative position engaging in frictionally and geometrically locking manner the corresponding flutings (24) in the joint-fittings (14) and pillars (11).

10. Ceiling lattice defined in claim 1, characterized in that the pillars (11) are flush at their upper ends with the top side of the ceiling lattice (10, 110, 210).

11. Ceiling lattice defined in claim 1, characterized in that the pillars (11) project by their ends (41) above the ceiling lattice (310).

12. Ceiling lattice defined in claim 11, characterized in that bracing by cables (42) is present between the upper ends (41) of the pillars (11) and the ceiling lattice (310).

13. Ceiling lattice defined in claim 1, characterized in that the ceiling lattice (210, 310) consists of lattice-girder units (37) connected on edge to the pillars (11) and joint-fittings (14').

14. Ceiling lattice defined in claim 13, characterized in that the lattice-girder units (37) form gaps, the gaps filled by sealing elements.

15. Ceiling lattice defined in claim 1, characterized in that wall components (36) are inserted into mutually opposite longitudinal flutings (24) of adjacent pillars (11) underneath the ceiling lattice (110).

16. Ceiling lattice defined in claim 1, further comprising right-cylindrical connection sections (60) and wall components (36'), each right-cylindrical connection section (60) and wall component (36') clamped into a longitudinal fluting (24) of a pillar (11").

* * * * *